United States Patent [19]

Newell

[11] 4,396,465

[45] Aug. 2, 1983

[54] METHOD FOR MAKING SEAMLESS METALLIC RIBBON BELTS FOR TAPE CARTRIDGES

[75] Inventor: Chester W. Newell, San Jose, Calif.

[73] Assignee: Newell Research Corporation, Saratoga, Calif.

[21] Appl. No.: 386,508

[22] Filed: Jun. 9, 1982

Related U.S. Application Data

[62] Division of Ser. No. 162,633, Jun. 24, 1980, Pat. No. 4,342,809.

[51] Int. Cl.³ .......................... C25D 1/02; C25D 1/20
[52] U.S. Cl. .......................................... 204/9; 204/13
[58] Field of Search ...................................... 204/9, 13

[56] References Cited

U.S. PATENT DOCUMENTS 1,236,438  8/1917  Huggins ................................. 204/9
4,252,027  2/1981  Ogden ................................... 204/9

Primary Examiner—T. M. Tufariello
Attorney, Agent, or Firm—Thomas Schneck

[57] ABSTRACT

A method for making endless metallic ribbon drive belts for tape cartridges. Metal is electroformed on a steel ring sandwiched between two non-conductive discs. After removal from the steel ring, the plated ring is thinly coated with an elastomeric coating resulting in a compound belt having a low coefficient of elasticity in the base belt and a high coefficient of friction in the coating.

3 Claims, 9 Drawing Figures

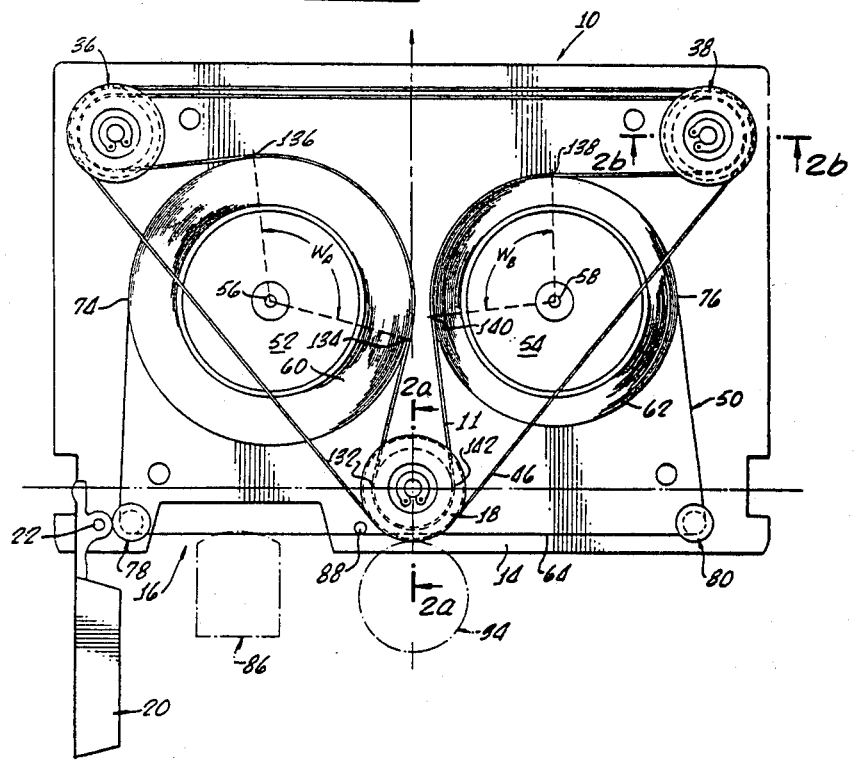

METHOD FOR MAKING SEAMLESS METALLIC RIBBON BELTS FOR TAPE CARTRIDGES

CROSS REFERENCE TO RELATED APPLICATION

This application is a division of application Ser. No. 162,633 filed June 24, 1980, now U.S. Pat. No. 4,342,809.

TECHNICAL FIELD

The invention relates to tape transport systems, and in particular to a method for making seamless metallic ribbon belts to be used in belt constructions for drive belts which engage the periphery of the tape supply and take-up rolls.

BACKGROUND ART

In tape drive systems where tape is driven by a belt engaging the periphery of the tape supply and take-up rolls, the velocities of the belt in the take-up and supply regions are unequal and hence unbalanced in such a manner that tension is developed in the tape span between the belt/tape-roll engagement regions.

Various methods of driving tape with peripheral belt drive transports give rise to various velocity differentials in the drive belts. Some of these methods are exemplified in U.S. Pat. Nos. 3,305,186 to Burdorf; 3,620,473 to Stone; 3,692,255 to VonBehren and 4,172,569 to Newell. Each of these patents teaches a means of developing a velocity differential at the belt radial centerlines; however, the resulting velocity at the tape radial centerlines in the corresponding tape engagement regions is reduced by the radius ratios of belt centerlines to tape centerlines. The velocity differentials of belt and tape radial centerlines will be equal only when the supply and take-up roll radii are equal, or at the midpoint of tape passage.

The problem of net belt tension variation in stiff-belted drives was first defined mathematically by W. E. Seaman and later described in a paper entitled "An Improved ANSI-Compatible Magnetic Tape Cartridge" by C. W. Newell, published in the IEEE Transactions on Magnetics, Vol. Mag.-14 No. 4, July 1978. For practical tape hub and roll radii, tape thicknesses and tape drive geometry, using belts of conventional design as to the thickness and elasticity, it was shown that the tape tension variation which must be tolerated is typically on the order of 25% of nominal tape tension, or higher.

An object of the invention is to devise a method for forming seamless metal rings to make very thin, yet stiff belts for minimizing the net tension variation in the drive belt, i.e. the so-called Seaman effect.

In stiff-belted drives of the type described in the previously mentioned U.S. Pat. No. 4,172,569 a unique problem has arisen, first identified by R. T. Steinbrenner of Bell Telephone Labs, and for purposes of identification known as the "Steinbrenner effect." As the tape is drawn onto the tape take-up roll periphery, it is initially wrapped in loose contact with the roll.

As the belt wraps upon the take-up roll periphery, the driving inner surface of the belt will lose length with respect to the belt centerline, if the belt and tape webs are allowed to slip on the periphery while the belt is being bent around the take-up roll. This loss in length or "shrinking" at the belt surface will be accompanied by an incremental increase in the surface velocity of the belt where it first engages the tape. The resultant tape velocity in the slipping interface between roll and belt will also incrementally increase during the slip, since the first tape layer is loosely wrapped on the roll. The larger the slip angle, the greater the amount of extra tape that will be drawn in at the nip. The slip angle can be reduced by: (a) reducing the amount of air entrapped between the first and second tape layers; (b) increasing the coefficient of friction between the belt surface and the tape; the inner surface velocity will thus very quickly match the tape roll surface, and all belt stretch will be positive and outward from the inner belt surface rather than positive and negative around the belt centerline.

It should be noted that the incremental increase in tape velocity at the take-up nip is not complemented by an incremental decrease of tape velocity at the supply nip, since the tape is already "wrung" to the surface of the supply roll periphery and thus is metered solely by the tape-roll periphery itself and not by the belt, per se. The above phenomena result in an "inch-worming" effect, whereby upon reversal of tape, a small but significant increment of tape is drawn in, and an incremental tape tension increase will result. Upon repeated reversals over the same tape length, the tension will climb until the forces build to equilibrium, the tape in effect pulling itself out of the nip at the same rate it is being pulled in.

A second object of the invention therefore is to devise a method for forming stiff metal rings for belts which will allow entrapped air to readily escape, and further to provide such belts with a high-friction surface, so that the slip angle will be reduced essentially to zero, minimizing the Steinbrenner effect.

In stiff-belted drives of the type where the belt wraps in contact with the tape recording surface, as previously described, yet another problem arises. That problem is physical damage to the tape surface from wear induced by the drive belt. It is important to avoid scuffing of the oxide surface, to minimize the generation of loss oxide particles.

It is also important to avoid embossing of any such particles into the surface of the tape, to minimize the likelihood of their being impact-welded to the tape surface before they can drop harmlessly away or can be actively removed by cleaners, whichever the case may be. Of particular concern are particles which are loosened in the scuffing action at the take-up nip between belt and tape roll, since these will be embossed on the tape surface by the belt before they can either drop away or be removed.

Therefore, the drive belt should make soft contact with the tape in order to substantially eliminate embossing of loose oxide particles into the recording surface, thereby substantially increasing the life of the tape as to digital data dropout rates or analog signal-to-noise ratio.

DISCLOSURE OF INVENTION

The seemingly contradictory requirements of a low-elasticity belt for minimizing net tension variation and a high-elasticity belt for high surface friction and soft contact with peripherally driven tape rolls have been met with compound belts featuring a base belt of low coefficient of elasticity with an elastomeric coating having a high coefficient of friction. The compound belt should at once be substantially narrower than the tape being driven to allow entrapped air to escape, as thin as possible, have high surface friction, yet be at least as stiff as the tape being driven.

Three examples of such belts are: (1) polyimide or polyester film base belts with a thin elastomeric film coating; (2) nickel, copper or steel base belts with a thin elastomeric film coating and (3) spirally wound filaments of high modulus of elasticity within an elastomeric matrix having a low modulus of elasticity, the filaments forming the base belt and the elastomeric matrix forming the coating on the base belt, holding the spiral loops in place.

Compound belts mentioned above have driven magnetic tape in cassettes of the type illustrated in FIG. 1 to accelerations up to 50,000 in/sec$^2$, compared to accelerations of 1200 in/sec$^2$ for typical belts in use today. These compound belts substantially reduce the Seaman and Steinbrenner effects, while also reducing wear on the tape surface.

BRIEF DESCRIPTION OF DRAWINGS

FIG. 1 is a top plan view of the interior of a typical tape cassette wherein a drive belt of the type made by the present invention may be used to drive rolls of tape.

FIG. 2a is a partial sectional view taken along lines 2a—2a of FIG. 1.

FIG. 2b is a partial sectional view taken along line 2b—2b of FIG. 1.

BEST MODE FOR CARRYING OUT THE INVENTION

Figure 3:
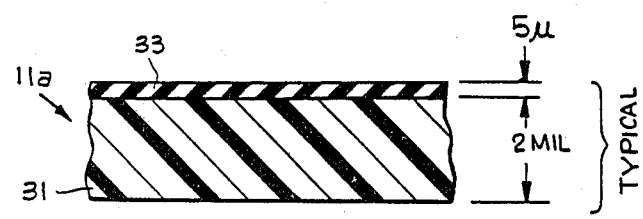
FIG. 3 is a partial side sectional view of a compound drive belt.

Referring now to the drawings, FIG. 1 shows a typical tape cassette configuration especially suited for electronic data processing applications using magnetic tape. The invention is not restricted to magnetic tape, but is applicable to other webs being wound and unwound. Similarly, the invention is described relative to tape cassettes, but the invention is applicable to other containers as well, or even to open reels mounted on supports.

A suitable cassette for use in this invention is described in prior U.S. Pat. No. 4,172,569, assigned to the assignee of this invention. A short description of this cassette follows. While this cassette is preferable because of high tape speeds which can be attained, cassettes, cartridges, and other containers with other constructions may be used.

A cassette 10 includes a wall 14 with a head aperture or port 16, a rotary drive and belt guide member 18, and a tape guard 20, which is mounted for rotation about a pin 22 fixed to wall 14 in order to render the cartridge compatible with existing commercially available equipment.

First and second hubs 52, 54 act as tape supply and take-up hubs and are rotatably mounted with parallel axes of rotation and in a generally coplanar relationship on the wall 14 by means of a pair of axial shafts 56, 58. A length of magnetic tape 50 having a nominally 0.001 inch backing thickness, or thinner, the backing made of Mylar or other such film, is distributed within the cassette 10, having one end portion or roll 60 wound on the first hub 52, an opposite end portion or roll 62 wound on the second hub 54, and an intermediate portion 64 extending between the hubs from a peripheral point 74 on tape roll 60 to a peripheral point 76 on tape roll 62. In operation the tape 50 passes between the rolls 60, 62 in a path parallel to the wall 14. The tape backing has a coating of magnetic material completely across the width of the tape, in this example the width being 0.25 inch.

The intermediate portion 64 of the tape is trained over a pair of similar tape guides 78, 80 which are non-rotatably fixed to the wall 14. The tape guides 78, 80 provide proper alignment of the tape 50 with the aperture 16 in order to maintain a proper operational relationship with a magnetic recording head which may be part of a tape drive, not shown, approaching the tape at the magnetic head position 86 when in operative placement with the tape drive. A tape support pin 88 fixed to the lower wall 14 prevents the tape 50 from touching the drive and belt guide member 18 while the head is in operational contact with recording tape 50.

The drive member 18 is rotatably mounted on a shaft to the wall 14 at a centered frontal position on the cassette 10 so as to come into contact with a drive capstan 94 when the cassette 10 is in operative placement in a record/playback apparatus, not shown.

The pair of similar rotary belt guide members, or idlers, 36, 38 are rotatably mounted on a pair of parallel shafts fixed to the lower wall 14. The idlers 36, 38 each have a stepped construction with pulley portions of different radii for affording different mechanical advantages as described in U.S. Pat. No. 4,172,569. The idlers 36, 38 and drive member 18 are all disposed on axes parallel to the axes of the hubs 52, 54 and are vertically aligned. A tensioning belt 46 is trained about the rotary drive member 18 and idlers 36, 38.

An endless loop drive belt 11 of the present invention having a fixed length is trained about the drive member 18 and the idlers 36, 38. The tensioning belt 46 is at a higher elevation than the drive belt 11 so as to clear the tape rolls.

As more clearly shown in FIG. 2a, the drive member 18 has a first level 13 and a second level 15 which offer different mechanical advantages. The second level 15 extends between a pair of rims 17, 19 of larger diameter than the first level. The larger diameter rims 17, 19 allow engagement of the drive capstan 94 with both the drive member 18 and the tensioning belt 46 trained about the second level 15. The effective diameter of the driven rims 17, 19 and the tensioning belt 46 results in a desired ratio of driven rim peripheral velocity of member 18 to resultant tape velocity.

The pair of similar rotary belt guide members, or idlers, 36, 38 are rotatably mounted on a pair of parallel shafts fixed to the wall 14. As best shown in FIG. 2b, illustrating idler 38, each idler 36, 38 is of a stepped construction having a first level 21 and a second level 23 for affording different mechanical advantage. The idlers 36, 38 and drive member 18 are all disposed on axes parallel to the axes of the hubs 52, 54 and are aligned in a vertical sense from the wall 14 such that the center of each of the first levels are corresponding in that they lie equally distant from the wall 14 and the centers of each of the second levels correspondingly lie an equal but greater distance from the wall 14.

An endless drive belt 11 having a fixed length (L) is trained about the first levels of the drive belt member 18 and the idlers 36, 38.

When the drive member 18 is rotated by the capstan 94 in a clockwise direction, the drive belt 11 departs the first level at a peripheral point 132 and the engages the tape pack 60 from a peripheral point 134 to a point 136 so as to define a wrap angle $W_A$, about the tape pack 60. Continuing, the endless drive belt 11 is trained about the pulley 36 on the first level thereof and the pulley 38 on the first level thereof before engaging the other tape pack 62 at a point 138.

The drive belt 11 engages the tape pack 62 from the point 138 to a point 140 so as to define a wrap angle $W_B$. Continuing, the drive belt 11 closes upon the drive member 18 at a point 142 on the first level thereof.

As shown in FIGS. 1, 2a and 2b, the drive belt 11 has a first portion 154, not shown, extending between the belt drive member 18 from the peripheral point 132 thereon to the belt guide or idler 36 at a peripheral point 156, not shown, thereon which engages the tape pack 60 wound on the first hub 52, and a second portion 158, not shown, extending between a peripheral point 142 on the drive member 18 to a peripheral point 160 on the idler 38, which engages the tape pack 62 wound on the record hub 54.

In prior U.S. Pat. No. 4,172,569 both the tape 50 and the drive belt 11 had the same Young's modulus of elasticity (E) because they were made of the same material, Mylar. The drive belt 11 was stiffer because it had greater cross-sectional area (A). The coefficient of elasticity describes the ability of a belt to stretch and is equal to 1/AE. Hence, since the cross-sectional area of the drive belt 11 is larger than that of the tape 50, its coefficient of elasticity is smaller which means the belt 11 is stiffer than the tape 50 for comparable span lengths. Typical stiffness ratios of drive belt to tape ranged from 2 to 1 for Mylar to over 100 to 1 for steel and fiberglass in the patent.

While such stiffness ratios are often preferable, there may be other considerations indicating a need for stiffness ratios as low as one to one, e.g. when the tape itself is quite stiff. For tape drives where the drive belt to tape stiffness ratio is as low as unity, a drive belt can be made as illustrated in FIG. 3. Such a stiffness ratio would exist where both the drive belt and the tape are made of the same material such as a polyimide or polyester, the former sold under the DuPont trademark Kapton, the latter sold under the DuPont trademark Mylar. Other stiff polymers could also be used. Besides being of the same material, the tape and the drive belt would have approximately the same cross-sectional areas. A requirement of the example according to FIG. 3 is that the drive belt have a coefficient of elasticity comparable to that of the tape being driven.

With reference to FIG. 3, the compound belt 11a comprises an endless base belt 31 having a uniform cross-sectional area and which is relatively thin and narrow. Preferably, the width of the belt is approximately half the width of the tape, or less. Note than when drive belt and tape are made of the same material, any decrease in width of the belt must be accompanied by an increase in thickness to the extent that the belt cross sectional area is not less than that of the tape. It is preferable to limit belt thickness however, to less than 5 mils, to prevent excessive velocity differentials between belt and tape radial centerlines. For example, for driving one-quarter inch tape the drive belt 11a would have a width of one-eighth inch or less. Such a narrow belt reduces the amount of air entrapped between tape layers and between the drive belt and a tape layer. This reduces the Steinbrenner effect, and increases the allowable acceleration rates without slippage for a given belt tension. A typical thickness for the base belt 31 is two mils, but thickness and width must be considered in making the belt have a coefficient of elasticity at least equal to the tape.

The base belt 31 is coated with an elastomeric coating 33 on a side of the base belt such that the coating 33 will come into contact with the periphery of the tape rolls, and particularly a side of the tape having a coating for information recording. A preferred thickness of the elastomeric coating is approximately five microns. Other coatings in the range of 1 to 10 microns would be acceptable.

To make a compound belt of the type shown in FIG. 3 a sleeve having a typical thickness of two mils is formed over a mandril, or stretched between two rollers. In accord with the previously mentioned example, polyimide or polyester sleeves may be used. A thin film of liquid primer is applied to these materials by spraying, knife coating or rolling. A material such as DuPont Polyester solution 46960 with curing agent RC802 can be roller applied with a film thickness of approximately one micron. After the primer has dried, a two-part curing liquid elastic film, such as Devcon Flexane 94 is roller-coated onto the prepared surface under pressure while removing excess Flexane from the roller. The Flexane elastomeric coating provides a relatively high coefficient of friction contacting the tape surface being driven. After curing, an elastic film of approximately five microns thickness with a preferred coefficient of friction greater than one, and a surface hardness of over 90 durometer will result. The sleeve is then slit into the desired width for drive belts.

For a stiffness ratio of one-to-one with respect to one-quarter inch tape in a drive, such as the one shown in FIG. 1, a drive belt comprising a two mil thick belt of Mylar coated with five microns of Flexane, slit into one-eighth inch belts was made. The belt was installed in a cassette similar to the one shown in FIG. 1, except for extra tape guides, not shown. The resulting stiff compound belt allowed tape acceleration up to 20,000 inches/sec$^2$. Both the Seaman and Steinbrenner effects were significantly reduced. Further, data dropout, believed to be due to wear of the magnetic media, was significantly reduced.

The base belt 31 of a stiff polymer with the elastomeric coating 33 together form the compound belt 11a. It is important that the compound belt have uniform cross-sectional area and a stiffness at least as great as that of the tape being driven.

Figure 4:
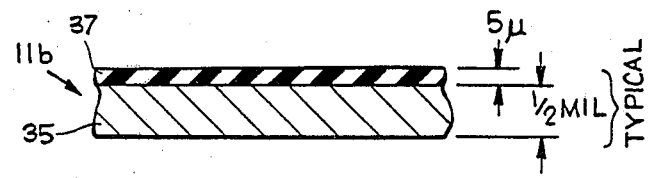
FIG. 4 is a partial side sectional view of a drive belt of the present invention.

An example of a drive belt is the metallic ribbon belt 11b illustrated in FIG. 4. In this example, the endless base belt 35 is a metal ribbon, such as nickel, steel, copper or alloys thereof, having a uniform cross sectional area. Sandvick alloy steel is available in roll thickness down to one-quarter mil and can be welded successfully into endless belts. Metal ribbon belts can be made much thinner than plastic polymer belts, such as polyimide or polyester, yet achieve high stiffness ratios.

The steel base belt 35 is coated with an elastomeric coating in the same manner that base belt 31 in FIG. 3 was coated. In this case, the primer used was Devcon Primer for Flexane. The resulting coating is again five microns. The same preferred elastomer, Flexane, may be used. Except for stiffness, which is five times that of the Mylar belt described, performance results of a compound steel belt are approximately the same as the belts described with reference to FIG. 3 with regard to reduction of the Steinbrenner effect and reduced wear of the recording coating on the tape, and the Seaman effect was reduced to a practical minimum.

Figure 5:
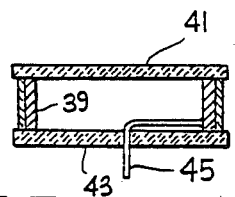
FIG. 5 is a side plan view showing the fixture for making nickel drive belts of the present invention.
Figure 6:
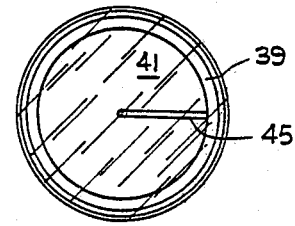
FIG. 6 is a top plan view of the fixture of FIG. 5.

While thin steel belts may be made from commercially available stock material, such belts must be welded and slit, and as a result are relatively expensive. Such is not the case for nickel and copper, which can be electroformed by the method of the present invention into a finished, seamless belt. With reference to FIGS. 5 and 6 a stainless steel ring 39 is sandwiched between two non-conductive disks, such as plastic disks 41 and 43. The diameter of disks 41 and 43 slightly exceeds the outside diameter of steel ring 39. The outside diameter of the ring 39 is equal to the desired inside unstretched diameter of a belt to be formed on the steel ring. A conductive metal wire 45 is connected through one of the disks 43 in a sealed relationship therewith and makes electrical contact with the inside diameter of the steel ring 39. The steel ring is cleaned at its outside diameter by dipping the sandwich formed by the ring 39 and the disks 41 and 43 into a degreasing solvent. The solvent should be somewhat volatile and of such type so that it will evaporate, leaving a clean film-free surface, after removal of the sandwich from the dip. The sandwich is then submerged in an electroforming plating tank and current is applied through wire 45 to the steel ring 39 which causes plating material to be deposited on the outside exposed surface of the steel ring. Several such sandwiches can be cascaded so that several belts can be made simultaneously.

Nickel or copper is electroformed on the steel ring to the belt thickness required. The width of the plating is equal to the exposed width of the steel ring and in turn this is selected to be equal to the desired belt width. After plating, the sandwich is removed from the plating fluid and the plastic disks are separated from the steel ring. The steel ring is separated from its plating by super cooling the plated ring by subjecting it to a stream of liquid nitrogen, then by thermally shocking the steel ring by dropping it into boiling oil. The plated ring separates from the steel and then in turn is coated with a five-micron elastomeric coating, as described above. The stiffness of the nickel-Flexane coated belt can be made comparable to the compound steel and Mylar coated belts by using nickel thicknesses in the range between one and five microns. For copper belts comparable to nickel, thickness should be doubled.

While examples of nickel, copper and steel belts have been given, any metal or metal alloy may be used which is capable of being manufactured with a uniform cross section and which has a stiffness at least equal to the polyester belts when the plating material is made into a solid ribbon.

Another example of a compound belt is described with reference to FIGS. 7 and 8. The belts in this example rely on filaments of high Young's modulus of elasticity which are coated with an elastomer and wound on a sleeve, with elastomeric material in the interstices between filaments. Young's modulus for the filaments is in the range of one to one-hundred million p.s.i. Winding is preferably helical and for the high range of Young's modulus may be multi-layer for the thinnest belts. The elastomeric material is characterized by a high coefficient of friction relative to the tape material. The coefficient is preferably greater than two and at least greater than one.

Figure 7:
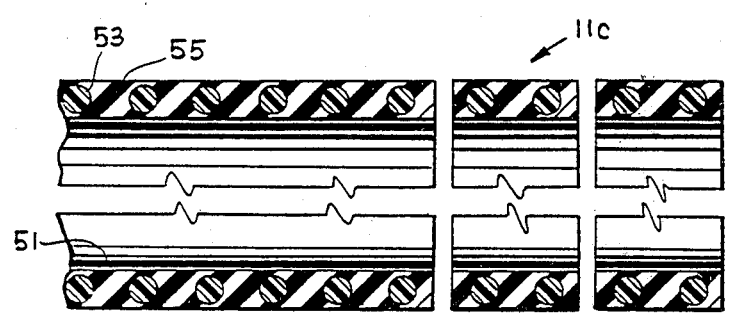
FIG. 7 is still another sectional view of another drive belt wherein spirally wound fibers are held in an elastomeric matrix.

FIG. 7 illustrates a sleeve 51 which is preferably Teflon. Spiral filaments of high modulus are coated with a two-part setting fluid elastomer and wound onto the sleeve. A few turns of filament 53 are shown to be wound on sleeve 51. The sleeve would typically have a circumference of at least several inches, while the lateral spacing between filaments would typically be a few microns. Previous to winding, the sleeve is coated with a thin coating of elastomeric material, such as Flexane or urethane, and the same elastic material is used to fill the interstices between windings in the zone 55. In FIG. 7, the filament is shown to be loosely wound. In practice, the windings are very closely spaced. Preferred filaments include very thin single strand fibers such as silk, fiberglass, graphite and high modulus polyamides. High modulus polyamide fibers are crystalline rigid-chain polymers based on para-substituted aromatic polyamides. A commercial material is sold under DuPont Company's trademark Kevlar for aramid fibers. Twisted fibers will also work, but are thicker and hence not preferred. Polyamide and graphite single strand fibers are commercially available at diameters of less than 0.1 mils. Such filamentary materials are ideal for making compound belts.

For example, a silk filament with a diameter of 0.3 mils was wound in two layers of opposite spirals for an overall thickness of 0.6 mils. Prior to winding the filament was dipped in a urethane tank and the excess removed, by passing the filament through a glass nozzle. Winding was over a Teflon sleeve with the filament density being approximately 63% over the sleeve. Liquid, two-part setting urethane is pressed onto the filaments so that solidified urethane fills the interstices between filaments such that a urethane matrix is formed holding the filaments in place. After the urethane sets, the Teflon sleeve is easily removed and the compound filament and elastomer belt is slit into widths of one-eighth inch. The resulting belt has the stiffness comparable to a compound Mylar-elastomer belt and is capable of accelerating magnetic tape at rates to 20,000 inches/sec$^2$. The Seaman and Steinbrenner effects are greatly reduced.

A great advantage of filamentary belts is that they can be made of very accurate length, are seamless, and can be made extremely thin. As stated, such thin belts tend to eliminate velocity differentials between drive belt and tape center lines.

Figure 8:
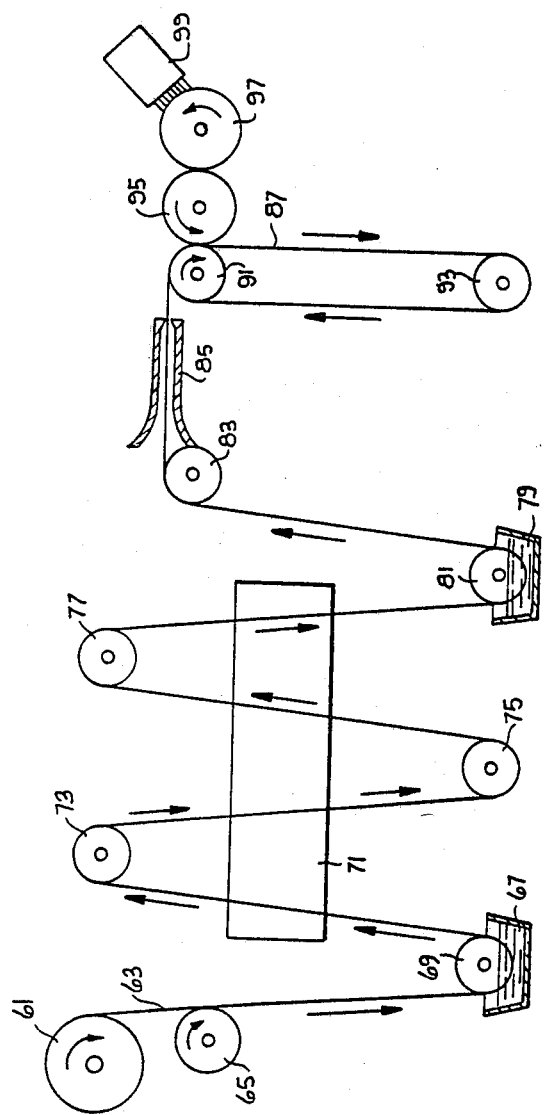
FIG. 8 is a plan view of a production method for coating fibers and spirally winding the fibers into the belt of FIG. 7.

FIG. 8 illustrates in more detail the method of making a filament-elastomer compound belt in production. A supply spool 61 carrying a roll of high modulus filament 63 feeds the filament to a tensioning pulley 65 about which a few turns of the filament are wrapped. The filament then proceeds to tank 67 containing a suitable primer for the filament and elastomeric materials used. Filament 63 proceeds over pulley 69 and past a drying section 71 which may supply heat by conduction, convection, or radiation. The filament proceeds from pulley 73 through the heat section 71 as many times as needed over additional pulleys, such as pulleys 75 and 77 and thence to a second tank 79 containing a two-part elastomeric material in liquid form with a high coefficient of friction, such as urethane. The filament then proceeds around pulley 81 to pulley 83 and thence to a nozzle 85 which removes excess elastomeric coating material. The filament then is spirally wound onto a sleeve such as a Teflon sleeve 87 which is stretched between rollers 91 and 93. While spiral winding is preferred to minimize belt thickness, other loop windings involving criss-crossing of the filaments will work. A coating roller 95 receives liquid urethane from a supply 99 which is transferred to it by a transfer drum 97, similar to ink transfer processes used in printing. The transfer cylinder 95 may itself be made of urethane, although in solid form. The cylinder 95 is biased against the sleeve 87 forcing liquid urethane into the interstices between filaments on the sleeve 87 and removing air bubbles. After the interstices are filled the belt is dried by mild heating. The sleeve 87 is removed and the belt is slit to desired widths. The resulting compound belt resembles the compound belt 11c of FIG. 7.

I claim:

1. A method of making metallic endless ribbon belts for peripherally driven tape rolls comprising, removably disposing a conductive belt between two solid insulating disks in contacting, parallel plane relation, thereby forming a sandwich structure, contacting the inside diameter of said conductive belt with a current carrying wire member, dipping said sandwich structure into metallic plating material, said metallic plating material having a stiffness in ribbon form greater than polyester, electrically plating a layer of said metallic plating material onto said conductive belt by directing current through said current carrying wire member, through said conductive belt and through said metallic plating material, removing said sandwich structure from the plating material and removing said conductive belt from the insulating disks, and removing said layer of metallic plating material from said conductive belt.

2. The method of claim 1 wherein the layer of metallic plating material is of nickel in a thickness between one and five microns.

3. The method of claim 1 wherein the layer of metallic plating material is of copper in a thickness between two and ten microns.

* * * * *